Patented June 20, 1950

2,512,390

UNITED STATES PATENT OFFICE 2,512,390

α-CHLOROVINYLSILANES

Leo H. Sommer, State College, Pa., assignor to Dow Corning Corporation, Midland, Mich., a corporation of Michigan No Drawing. Application June 3, 1949, Serial No. 97,084

5 Claims. (Cl. 260—448.2)

The present invention relates to polymerizable organosilicon compounds.

In the organosilicon field most of the known materials contain as the organic substituents non-functional radicals. Polymers are prepared by the hydrolysis of functional materials, such as chlorine, linked to the silicon, whereby the organosilicon polymers are siloxanes. Alkenyl derivatives of silicon have been described, and in particular, triethylvinylsilane. Such a material should be an excellent basis for the preparation of a new polymer variety, i. e. polymers in which the chain structure is a carbon chain and alternate carbon atoms are trialkylsilyl substituted. While this is an intriguing possibility, I have found that in general the alkenyl silanes do not polymerize satisfactorily. The vinyl silanes are sluggish. This necessitates the use of catalysts, such as aluminum chloride, in order to effect polymerization. The products so obtained are not of substantial interest. Longer chain alkenyl silanes in which the double bond is further removed from the silicon polymerize more normally. The products of such a polymerization are too branched to be of much interest in high polymer chemistry.

Objects of the present invention are the provision of silanes which undergo olefin polymerization readily with the formation of high polymers, and methods for the production thereof.

Silanes in accordance herewith contain the α-chlorovinyl radical linked to the silicon atom. Thus, the present silanes are of the type formula $CH_2=CClSiR_{3-n}X_n$ where R represents a hydrocarbon radical of the group consisting of alkyl and monocyclic aryl, and X represents a substituent of the group consisting of halogen and alkoxy and $n$ has an average value from 0 to 3.

These silanes may be prepared in accordance with the method hereof by the dehydrohalogenation of α,β-dichloroethyltrihalosilanes. This dehydrohalogenation product may then be substituted with organic radicals by reaction thereof with Grignard reagents, with organosodium or with organolithium compounds.

The α,β-dichloroethylsilanes may be prepared from an ethylsilane by the monochlorination of the ethyl radical followed by the dehydrohalogenation of the chloroethyl silane to a vinyl silane. This method is described by Ushakov at Journal of General Chemistry (USSR), volume 7, pages 2492–2498. The vinyltrichlorosilane may then be chlorinated, as shown in my copending application filed simultaneously herewith, by reacting it with chlorine gas whereby there is obtained the α,β-dichloroethyltrichlorosilane.

The α,β-dichloroethyl derivative so obtained may be dehydrochlorinated by well known dehydrochlorination methods, as for example, by reacting it with tertiary amines, particularly the cyclic tertiary amines such as quinoline, picoline or the like.

The α-chlorovinylsilanes so prepared may be employed for a wide variety of uses. They may be employed for coating glass. They may be copolymerized with organic olefins, such as styrene, vinyl chloride or vinyl acetate and the copolymer containing hydrolyzable chloride be employed for laminating sheet glass or for impregnating glass fiber fabric, whereby to obtain good plastic to glass bonding. The α-chlorovinylchlorosilanes, modified by substitution of organic radicals for some of the chlorine atoms on the silicon, may likewise be employed. Those which contain no silicon bonded chlorine may be copolymerized with organic vinyl polymers, such as those indicated, whereby to obtain substantial modification of the physical properties thereof. Also the α-chlorovinylsilanes which contain functional chlorine may be cohydrolyzed and cocondensed with other functional organosilanes whereby to obtain siloxane copolymers which may be thermoset by heating.

Example 1

A mixture of 50.5 parts by weight of α,β-dichloroethyltrichlorosilane and 32 parts of quinoline was heated. Vigorous foaming took place when the flask temperature reached 100° C. The product was distilled, whereby there was obtained the desired material, α-chlorovinyltrichlorosilane, boiling at 125° C. at 750.3 mm.

Example 2

0.4 gram moles of α-chlorovinyltrichlorosilane in 56 ml. of anhydrous ether was added to 1.32 gram moles of methyl magnesium bromide in 530 ml. of ether. The reaction mixture was maintained at 0° C. with stirring until the reaction was complete, as noted by the absence of further precipitation. Excess Grignard reagent was hydrolyzed by pouring over cracked ice and the product was made slightly acid. The product was then dehydrated, stripped to remove the ether and fractionally distilled. The product α-chlorovinyltrimethylsilane had the following properties:

$d_{20}$—0.8875
$n_D^{20}$—1.4299
B. P. °C.—105/729 mm.

Example 3

0.4 gram moles of phenyl magnesium bromide in 30 ml. of anhydrous ether was added to 0.4 gram moles of α-chlorovinyltrichlorosilane in 55 ml. of anhydrous ether. The reaction mixture was maintained at about 0° C. with stirring. The reaction product, following substantial completion of the reaction, was filtered, the ether stripped and the residue fractionally distilled under vacuum. The product, α-chlorovinylphenyldichlorosilane had a B. P. in the range between 79 and 92° C. at 2 mm.

That which is claimed is:

1. $CH_2=CClSiR_{3-n}X_n$ where R represents a hydrocarbon radical of the group consisting of alkyl and monocyclic aryl, X represents a substituent of the group consisting of halogen and alkoxy and $n$ has an average value from 0 to 3.
2. $CH_2=CClSiCl_3$.
3. $CH_2=CClSi(CH_3)_3$.
4. $CH_2=CClSiC_6H_5Cl_2$.
5. The method of producing α-chlorovinylsilanes which comprises dehydrohalogenating a material of the type $CH_2ClCHClSiX_3$ whereby a product is obtained of the type $CH_2=CClSiX_3$ where X represents a halogen.

LEO H. SOMMER.

REFERENCES CITED

The following references are of record in the file of this patent:

Hurd, "Jour. Am. Chem. Soc.," vol. 67 (1945), pages 1813, 1814.